United States Patent
Reynolds

(10) Patent No.: US 11,555,444 B2
(45) Date of Patent: Jan. 17, 2023

(54) SELF-CONTAINED, STAND-ALONE POWER GENERATOR

(71) Applicant: Eugene Reynolds, Denver, CO (US)

(72) Inventor: Eugene Reynolds, Denver, CO (US)

(*) Notice: Subject to any disclaimer, the term of this patent is extended or adjusted under 35 U.S.C. 154(b) by 0 days.

(21) Appl. No.: 17/558,723

(22) Filed: Dec. 22, 2021

(65) Prior Publication Data
US 2022/0205383 A1 Jun. 30, 2022

Related U.S. Application Data

(60) Provisional application No. 63/131,570, filed on Dec. 29, 2020.

(51) Int. Cl.
| | |
|---|---|
| F02N 11/08 | (2006.01) |
| F02B 63/04 | (2006.01) |
| H02J 7/00 | (2006.01) |
| F02N 19/00 | (2010.01) |
| F02N 11/04 | (2006.01) |

(52) U.S. Cl.
CPC .......... *F02B 63/048* (2013.01); *F02N 11/04* (2013.01); *F02N 11/0866* (2013.01); *F02N 19/00* (2013.01); *H02J 7/0013* (2013.01); *F02N 2011/0896* (2013.01)

(58) Field of Classification Search
CPC ...... F02N 11/04; F02N 11/0866; F02N 19/00; F02N 2011/0896; F02B 63/04; F02B 63/048; H02J 7/0013

USPC .................... 123/179.25, 179.28; 290/31, 32
See application file for complete search history.

(56) References Cited

U.S. PATENT DOCUMENTS

| | | | |
|---|---|---|---|
| 7,108,095 B1 | 9/2006 | Washington et al. | |
| 9,748,776 B2 | 8/2017 | Dubois et al. | |
| 9,893,597 B2 | 2/2018 | Botts | |
| 10,461,622 B2 | 10/2019 | Miller | |
| 10,511,209 B2 | 12/2019 | Matsuhisa et al. | |
| 10,742,062 B2 | 8/2020 | Virella | |
| 2015/0096518 A1* | 4/2015 | Creviston | F02N 15/067 123/179.3 |
| 2015/0188400 A1 | 7/2015 | Kemp et al. | |
| 2015/0200546 A1 | 7/2015 | Demar | |
| 2016/0072373 A1 | 3/2016 | Farquharson | |

FOREIGN PATENT DOCUMENTS

| | | |
|---|---|---|
| CN | 201846220 | 5/2011 |
| TW | M521845 U | 5/2016 |

* cited by examiner

*Primary Examiner* — Hai H Huynh
(74) *Attorney, Agent, or Firm* — David Michie

(57) ABSTRACT

A self-contained, stand-alone power generator system comprising: an electric motor for applying torque to a shaft of a rotating mass, wherein the electric motor is powered by a dedicated power source; a battery for supplying additional power to the electric motor upon start up; at least one of a torque converter and a starter motor, for overcoming resting inertia of the rotating mass; a generator head coupled to the rotating mass, wherein the power generator is constructed such that when the generator head reaches operational speed, the generator head provides the additional power to the electric motor and recharges the battery.

18 Claims, 4 Drawing Sheets

SELF-CONTAINED, STAND-ALONE POWER GENERATOR

CROSS-REFERENCE TO RELATED APPLICATIONS

This application is a non-provisional of, and claims the benefit of priority from, U.S. Provisional Patent Application No. 63/131,570 filed Dec. 29, 2020.

FEDERALLY SPONSORED RESEARCH

Not Applicable.

FIELD OF INVENTION

The present disclosure generally relates to power generators, and more particularly to a self-contained, stand-alone power generator using a rotating mass or flywheel to generate usable power.

BACKGROUND

Electric power generators are useful as an emergency backup in a power outage. In addition, power generators can act as a primary source of power in areas where electricity from the main grid is not accessible. However, these power generators typically require access to combustible fuels, sun, wind, or water.

Some power generators include an internal-combustion engine (ICE) or are started by plugging into grid power. Others are started with a pull cord, or by attaching an external ICE to start the system in motion. There are drawbacks to using a pull cord. For instance, an elderly person might not have the strength to operate the pull cord. In addition, using an ICE or grid power can require access to fossil fuels or to the grid.

SUMMARY

Embodiments of the present disclosure can provide a stand-alone, self-contained power generator that can be set up anywhere without need for, or access to, combustible fuels, water, wind, or sun. As such, electricity can be generated without having to rely on these forms of energy sources. In addition, the power generator may be a portable device that can be easily transported to a location of interest.

In all embodiments, a dedicated power source may supply an electric motor. In some embodiments, additional electrical power may be supplied to the electric motor from a battery. The supplied electrical power may cause the electric motor to rotate. The electric motor can apply torque to a shaft connected to a rotating mass such as a flywheel. The torque applied to the shaft can cause rotation of the flywheel. A torque converter and/or starter motor may be used to overcome the inertia needed to get the flywheel up to operational speed. The flywheel may be connected to a generator head such that the torque from the flywheel is applied to the generator head, causing the generator head to rotate and generate electricity. When the generator head has reached operational speed, the generator head can provide the power for operating the inverter and recharging the battery.

In some embodiments, electrical power can be supplied to at least one electromagnet from a battery. The supplied electrical power may cause the electromagnet to generate a magnetic field. The magnetic field can exert a force on a rotating mass (e.g., flywheel) to cause rotation of the flywheel. A starter motor can be used to overcome the inertia needed to get the flywheel up to operational speed. The flywheel can be connected to a generator head such that the torque from the flywheel is applied to the generator head, causing it to rotate and generate electricity. When the generator head has reached operational speed, the generator head can provide the power for operating the at least one electromagnet and recharging the battery.

In one exemplary embodiment, a self-contained, stand-alone power generator includes an electric motor for applying torque to a shaft of a rotating mass. The power generator further includes a battery for supplying power to the electric motor upon start up. The power generator further includes at least one of a torque converter and a starter motor, for overcoming resting inertia of the rotating mass. The power generator further includes a generator head coupled to the rotating mass. The power generator is constructed such that when the generator head reaches operational speed, the generator head provides power to the electric motor and recharges the battery.

In the above embodiment, the power generator may include a starter motor and a super capacitor for supplying energy to the starter motor. The super capacitor may be recharged by the generator head. The electric motor may be connected to the shaft using at least one of a gear, a sprocket and chain, and a pulley and belt. The power generator may further include a sensor to monitor rotational speed and/or position of the rotating mass. The power generator may further include an electronic control system for controlling speed of the electric motor via an electronic speed controller. The battery and the generator head may be electrically connected to the electric motor via an inverter. The rotating mass can be connected to the generator head via at least one of gear, sprocket and chain, and pulley and belt. The power generator may further include an automatic switch configured to, when the generator head has reached a predetermined operational speed, switch from power supplied by the battery to power supplied by the generator head. A heat sink can be attached to or incorporated into a casing of at least one of the generator head and electric motor, so as to pull heat away from the at least one of the generator head and electric motor.

According to another exemplary embodiment, a self-contained, stand-alone power generator includes at least one electromagnet for generating a magnetic field that exerts a force upon the rotating mass. The power generator further includes a battery for supplying power to the at least one electromagnet upon start up. The power generator further includes a starter motor for overcoming resting inertia of the rotating mass. The power generator further includes a generator head coupled to the rotating mass. The power generator is constructed such that when the generator head reaches operational speed, the generator head provides power to the at least one electromagnet and recharges the battery.

In the foregoing embodiment, the power generator may include a super capacitor for supplying energy to the starter motor. The super capacitor may be recharged by the generator head. The power generator may further include a sensor to monitor rotational speed and/or position of the rotating mass. The power generator may further include an electronic control system for controlling the at least one electromagnet. The battery and the generator head may be electrically connected to the at least one electromagnet via an inverter. The rotating mass may be connected to the generator head via at least one of a gear, a sprocket and chain, and a pulley and belt. The power generator may further include an automatic switch configured to, when the generator head has reached a predetermined operational speed, switch from power supplied by the battery to power supplied by the generator head. The at least one electromagnet can comprise an array of electromagnets arranged around an outside of the rotating mass.

According to another exemplary embodiment, a self-contained, stand-alone power generator includes an electric motor for applying torque to a shaft of a rotating mass. The power generator further includes a battery for supplying power to the electric motor upon start up. The power generator further includes a first motor/generator connected by a shaft to the electric motor. The power generator further includes a second motor/generator connected by a shaft to the first motor/generator. The second motor/generator is connected to the shaft of the rotating mass. The first and second motors/generators are constructed such that when the first and second motors/generators reach operational speed, the first and second motors/generators provide power to the electric motor and recharge the battery.

An objective of the prestation invention is to improve efficiency of maintaining the torque of the flywheel during initial start up and operational changes in load/demand applied to the generator. Ensuring the flywheel has adequate torque would prevent a shut-off, overload, over-heat, or circuit-breaker trip situation. This may occur when electrical demand is increased, but the rotating mass or flywheel of the electrical generator has not built up enough speed/momentum to produce the required electrical energy. Another objective is to reduce the time needed for the generator to start-up and/or adjust to a change in load demand by supplying additional power to the electric motor from a separate battery via an inverter. This would allow the electric motor to more readily respond to an increase demand.

These as well as other aspects and advantages will become apparent to those of ordinary skill in the art by reading the following detailed description, with reference where appropriate to the accompanying drawings. Further, it should be understood that the embodiments described in this summary and elsewhere are intended to be examples only and do not necessarily limit the scope of the present disclosure.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
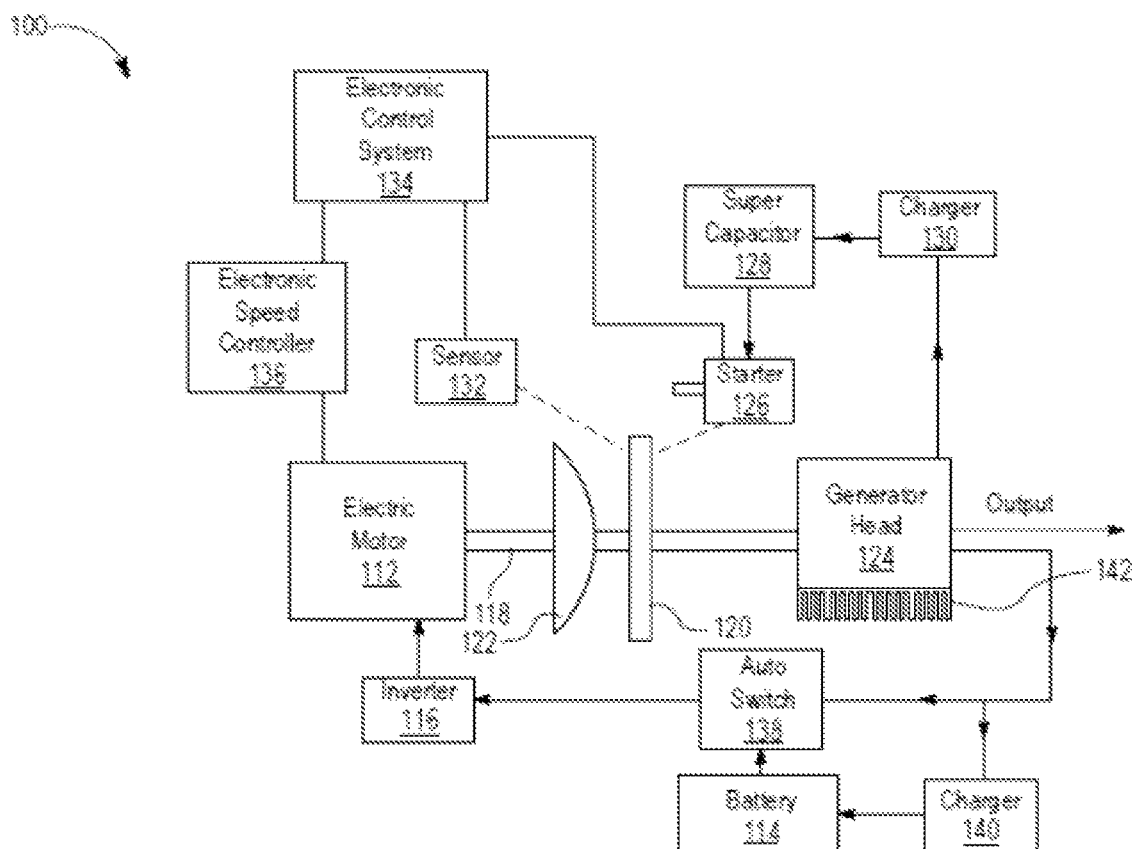
FIG. 1 shows a schematic diagram of a power generator according to one example embodiment.

Accordingly, embodiments of the present disclosure relate to a self-contained, stand-alone power generator that can provide electricity without access to a combustible fuel source, water, wind or sun.

In all embodiments, a dedicated power source may supply an electric motor (i.e., electrical, mechanical, thermal, etc.). In most embodiment, additional electrical power may also be supplied to the electrical motor from a battery or battery pack (hereinafter referred to as battery) during a time of increased energy demand. The battery may be connected to the electrical motor either directly or through an inverter. The supplied electrical power causes the electrical motor to rotate and/or increase rotational speed during times of increase electoral load demand. The electric motor may apply torque (e.g., rotational energy) to a shaft connected to a rotating mass (e.g., a flywheel). In most embodiments, the electric motor applies the torque to the shaft either by being directly connected to the shaft, or connected through at least one of a series of pulleys and belts, sprockets and chains, and gears. By using connections other than a direct connection, the electrical motor may use ratios other than 1:1 to achieve proper rotational speeds of the flywheel more efficiently. The torque applied to the shaft connected to the flywheel induces angular momentum (or, simply, rotation) in the flywheel.

In most embodiments, the mass of the flywheel may be significant, it may be useful to have a system or method in place to overcome the inertia needed to get the flywheel rotating, and thus the generator head may be used to bring the flywheel up to operational speed. For instance, a speed sensor may be used to monitor the rotational speed of either the flywheel or the shaft connected to the flywheel. The output torque of the electric motor may be applied to the shaft of the flywheel through a torque converter. This torque converter may allow the electric motor to get the flywheel up to rotational speed without putting an excessive load on the electric motor.

In a main embodiment, a high-speed, high-torque, short-use motor may be used to help overcome the resting inertia of the flywheel and induce angular momentum (or rotation) into the flywheel. The faster the flywheel can be started in the rotating process at this point would reduce the strain on and increase the speed at which the electric motor may get the system up to operational speed. It may be possible to use the starter motor only during the initial start up sequence, with the starter motor not otherwise being connected to any components in the system.

In some embodiments, the starter motor may need more energy than can be safely provided by a battery. In this case, super capacitors may be used to supply the necessary energy to the starter motor during start-up. Once started and running, the generator head can recharge the super capacitors for next use. During start up, the speed sensor can monitor the speed of the shaft or flywheel. This information can be sent to an electronic control system. This control system can control the speed of the electric motor via an electronic speed controller. The speed controller may adjust the speed of the electric motor up or down as necessary to bring the power generator system up to a predetermined, operational speed so as to reduce strain on the connected components.

In most embodiments, the flywheel can be connected to the generator head via the same methods used to connect the electric motor to the flywheel described above. Torque from the flywheel can be applied to the generator, causing the generator to rotate. The generator can generate electricity when rotating. When the generator has reached the proper predetermined operational speed, power for operating the inverter may switch from being supplied by the battery to being supplied by the generator either through direct connection or through an automatic switch device. The automatic switch device may be part of an overall electronic control system or a standalone device. Once the generator is operating normally and power has switched from the battery to the generator, the generator may recharge the battery as well as any connected super capacitors.

In another embodiment, angular momentum may be induced into the flywheel by using an electromagnet system. In this configuration, the electric motor may be removed and an array of electromagnets may be arranged around the outside of the flywheel in a specific configuration. The flywheel may be made of a non-magnetic or low-magnetic material to prevent possible interference with the electromagnets and/or malfunction. Permanent magnets or a magnetically reactive material may be arranged on a surface of the flywheel in a circular pattern at regular intervals. The electromagnets may be arranged around an outside of the flywheel in a non-regular interval so as to optimize a push-pull operation. When using permanent magnets, one electromagnet can operate to "pull" a magnet towards itself, and another electromagnet can operate to "push" a magnet away from itself. The electromagnets can switch polarity as needed in this operation. The timing and frequency of these pulses may be determined by both the speed sensor and a position sensor that monitors the position of the flywheel. The speed and position sensors may be used to maintain a proper operating speed. The electromagnet array may require less power for operation as compared to a system utilizing an electric motor.

In most embodiments, the electrical output of the generator may be used to provide power to external devices and to provide power to the motor or electromagnet array. The electrical output of the generator may also be used to recharge the battery and any connected supercapacitors. The power can be provided by an inverter or inverters electrically connected to the output of the generator head.

Other than the difference between using an electric motor and an electromagnet array, interconnectivity between the components may remain the same in either configuration of generator. Either configuration may use an electronic control module to monitor the various components (i.e., the motor, the electromagnet, and/or the flywheel) to maintain operational speed, any charging of batteries and/or connected supercapacitors, and/or the functional stability of the components.

In another embodiment, an electric motor may be connected by a shaft to a first generator/motor that may then connected by a first shaft to a second generator/motor that may be then connected by a second shaft to a flywheel. In some embodiments, a through-shaft may be used to connect the first generator/motor and the second generator/motor. Each of the first and second motors/generators may be capable of generating 55 kilowatts (55 kW). As such, it may be possible to generate 110 kW in a relatively small space.

In some embodiments, heat may be generated from the various components during operation, most notably the generator head, the electric motor, and/or the electromagnet array. Thus, in those embodiments, a system for pulling heat away from these components may be needed, such as an air cooling system, liquid cooling system, or some combination of those two systems may be used to pull heat away from the various components.

In some embodiments that may use air cooling, heat sinks of some type can be attached to or built into the casings of the relevant components. For example, a heat sink with fins can be used to increase the surface area and help dissipate heat. The Heats sinks may be made of any suitable material, i.e., copper, aluminum, steel, stainless steel, non-ferrous steel, etc., that can effectively conduct heat away from the system.

In some embodiments that may use liquid cooling, heat generated by the components may be transferred to a liquid medium that carries heat away from the system where the liquid may be cooled down and recirculated. The liquid may be circulated through the system by a pump. In some embodiments, a method of cooling the liquid (e.g., via a radiator) may be part of the system. The radiator may be connected to or engineered as part of the casings of the relevant components of the generator.

Referring to the drawings, FIG. 1 shows a power generator system 100 according to an example embodiment. In all embodiments, an electric motor 112 may be supplied with power from a dedicated stored power source, i.e., electrical, mechanical, thermal, etc., (not shown). In all embodiments, an inverter 116 may be activated and/or supply additional power to the electric motor 112 when an output load requires additional output electricity that may cause the electric motor 112 to increase speed to meet the additional demand, so as to assist the electric motor 112. Electric power may be supplied to the electric motor 112 from a battery 114. The battery 114 may be removable. The battery 114 may be a rechargeable battery. Thus, the battery 114 may be any of a nickel-cadmium (NiCd) battery, a nickel-metal hydride (NiMH) battery, a lithium-ion (Li-ion) battery, or the like. The battery 114 may be connected to the electric motor 112 through the inverter 116. The inverter 116 may change direct current (DC) to alternating current (AC). The supplied electrical power may cause the electric motor 112 to rotate. The electric motor 112 may apply torque to a shaft 118 connected to a torque converter 122. The torque converter 122 may be a fluid type coupling device that transfers rotating power from the electric motor 112 to the flywheel 120. The torque converter 122 may allow the electric motor 112 to get the flywheel 120 up to operational speed without putting an excessive load on the electric motor 112.

In most embodiments, a starter motor 126 may be used to help overcome the resting inertia of the flywheel 120 and induce angular momentum of the flywheel 120. The starter motor 126 may be a high-speed, high-torque, short-use motor (e.g., a starter motor similar to those used in internal-combustion engines). A shaft of the starter motor 126 may carry a small pinion which may engage with a large gear ring around a rim of the flywheel 120 (not shown). In some embodiments, the starter motor 126 may be used only during the initial start up sequence of the power generator system 100. Otherwise, the starter motor 126 may not be engaged with the flywheel 120.

In another embodiment, at least one super capacitor 128 may be used to supply the necessary energy to the starter motor 126 during the initial start up sequence. In this embodiment, once the power generator 100 is started and operating, a generator head 124 of the power generator 100 may recharge the super capacitor 128 via a charger 130 so that the at least one super capacitor 128 may be available for use on the next initial start up sequence. In some embodiments, the super capacitor 128 may be a battery, where the battery may be recharged by the charger 130.

In most embodiments, a sensor 132 may monitor at least one of a rotational speed and a position of the flywheel 120. The sensor 132 may be an inductive sensor, a hall effect sensor, a magnetoresistive sensor, an optical sensor, or the like. The sensor 132 may be disposed proximate to the flywheel 120, e.g., close enough to the flywheel to detect the rotational speed and/or the position. In an alternative embodiment, the sensor 132 may be disposed on the flywheel 120. In another alternative embodiment, the sensor 132 may detect the rotational speed and/or the position of the shaft 118 of the electric motor 112, where the sensor 132 may be positioned on or proximate to the shaft 118.

During start up, the sensor 132 may monitor the rotational speed and/or the position of the flywheel 120. Rotational speed data or position data may be sent to an electronic control system 134, which may include a processor and a memory. The memory may store programming modules that when executed by the processor, may control the operation of the control system 134.

In most embodiments, the electronic control system 134 may control a speed of the electric motor 112 via an electronic speed controller 136. The speed controller 136 may be an electric circuit that controls and regulates the speed of the electric motor 112. The speed controller 136 may adjust the speed of the electric motor 112 (either by a positive or negative value) to reduce strain on the connected components of the power generator 100. In some embodiments, the electronic control system 134 may control the starter motor 126 to engage the flywheel 120 upon the initial start up sequence. In most embodiments, once the flywheel 120 is in motion, the starter motor 126 may then disengaged from the flywheel 120.

In most embodiments, the generator head 124 may be connected to the shaft 118. Torque from the flywheel 120 may be applied to the generator head 124 that may cause the generator head 124 to rotate. The generator head 124 may generate electricity when rotating. In most embodiments, when the generator head 124 has reached a proper predetermined operational speed and/or electrical power output for operating the power generator 100, the inverter 116 may switch from being supplied by the battery 114 to being supplied by the generator head 124. In most embodiments, this switch may happen automatically using an auto switch 138. In some embodiments, the auto switch 138 may be an automatic transfer switch (ATS) containing a pair of relays (e.g., an auto switch similar to those used for switching recreational vehicles from shore power to generator power). The auto switch 138 may be part of the overall electronic control system 134. Once the generator head 124 is operating normally and power to the inverter 116 has switched from the battery 114 to the generator head 124, the generator head 124 may recharge the battery 114 using a charger 140 as seen in FIG. 1. In some embodiments, the generator head 124 may recharge the supercapacitor 128 using the charger 130.

In most embodiments, the generator head 124 may have a finned heat sink 142 attached thereto, so as to provide air cooling that may pull heat away from the generator head 124. In most embodiments, the fins 142 may increase the heat transfer from the generator head 124 by increasing convection between the air and the generator head 124. In an alternative embodiment, the finned heat sink 142 may be built into a casing of the generator head 124. In some embodiments, the finned heat sink 142 may also be attached to or built into a casing of the electric motor 112.

Figure 2:
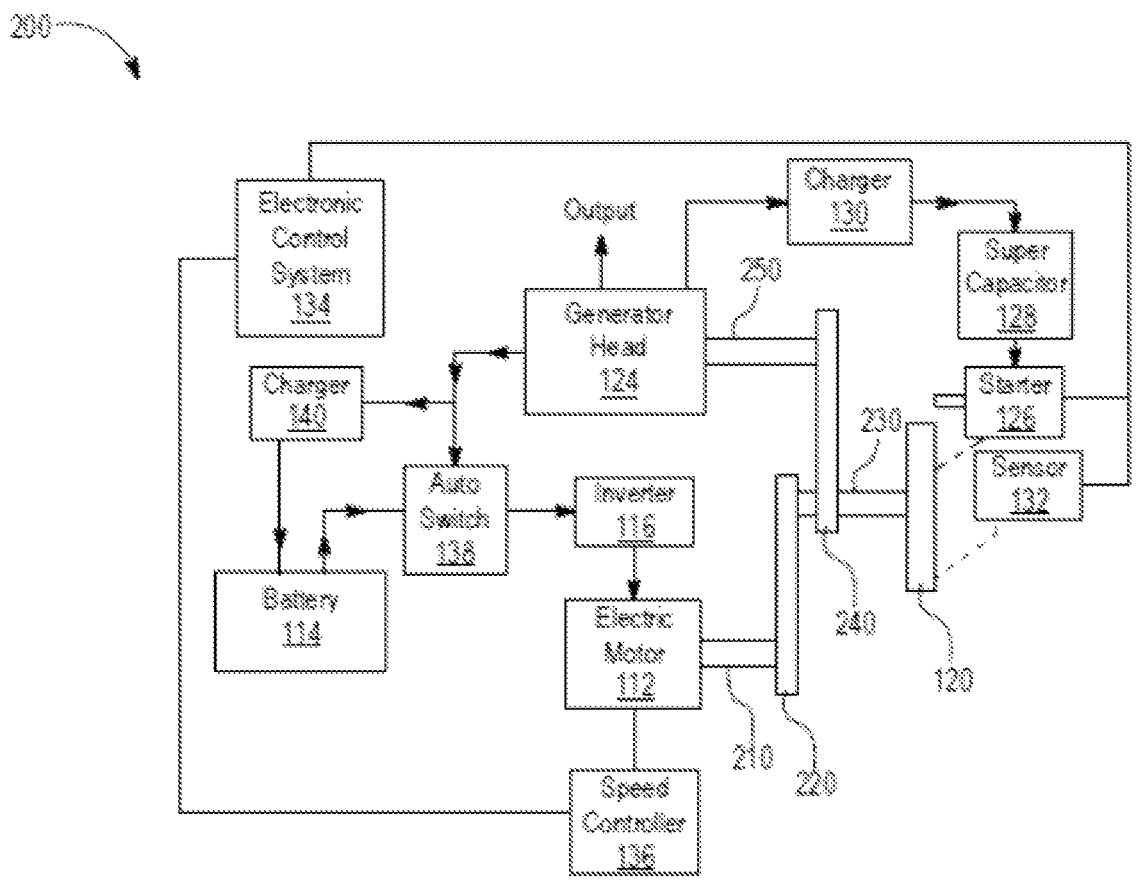
FIG. 2 shows a schematic diagram of a power generator according to one example embodiment.

FIG. 2 shows a power generator system 200 according to an example embodiment. The electric motor 112 may be connected by a shaft 210 to a torque converter 220. The torque converter 220 may be a continuous variable transmission (CVT) which may include two variable diameter pulleys connected by a V-belt (e.g., a torque converter similar to the ones used in go-karts). In an alternative embodiment, a series of pulleys and belts, sprockets and chains, and/or gears may be used in place of the torque converter 220.

In most embodiments, the torque converter 220 may be connected by shaft 230 to the flywheel 120. The flywheel 120 may be connected by shaft 230 to a series of pulleys and belts, sprockets and chains, and/or gears 240. The series of pulleys and belts, sprockets and chains, and/or gears 240 may be connected by shaft 250 to the generator head 124. The use of the pulleys and belts, sprockets and chains, and/or gears 240 may make the power generator system 200 capable of using ratios other than 1:1 to achieve proper rotational speeds more efficiently.

Figure 3:
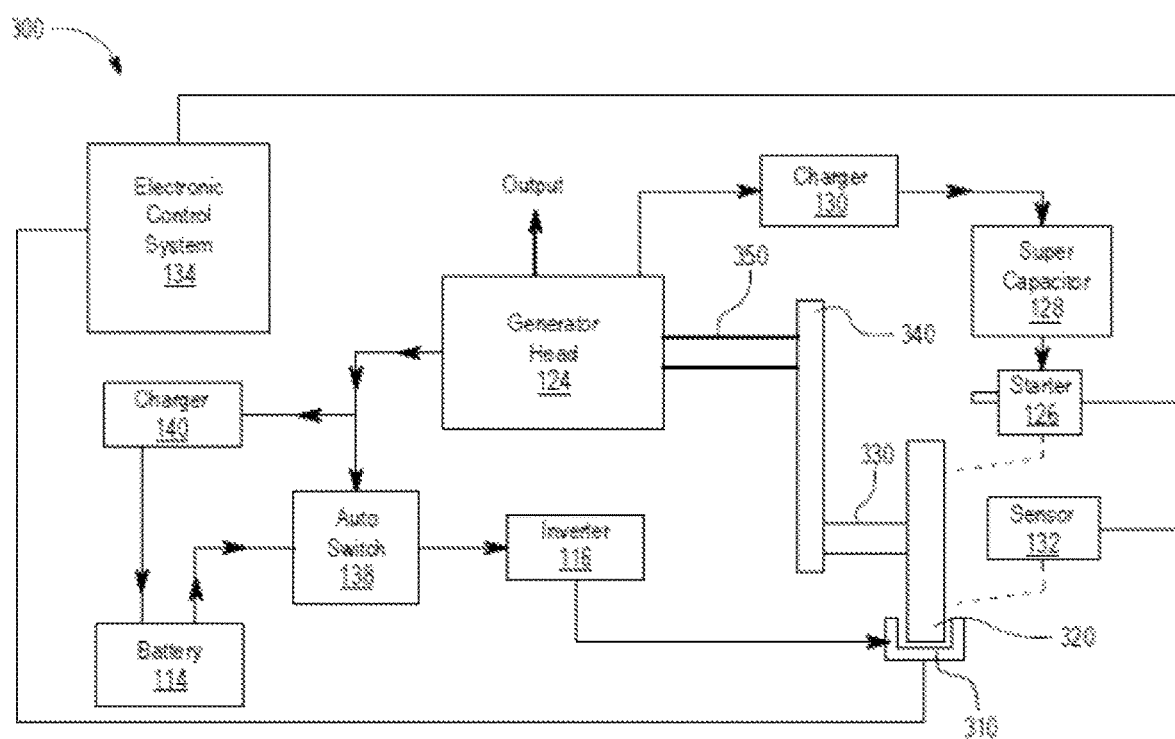
FIG. 3 shows a schematic diagram of a power generator according to one example embodiment.

In another embodiment, FIG. 3 shows a power generator system 300. In some embodiments, the flywheel 320 may be moved by an array of electromagnets 310 arranged around an outside of the flywheel 320. The sensor 132 may interact with the flywheel 320 to determine the rotational speed and/or the position of the flywheel 320 via the electronic control system 134 (as discussed above), so that the electromagnets 310 may be energized at the proper a time, interval, duration, and frequency. Power may be provided to the electromagnet array 310 via the inverter 116

In some embodiments, the flywheel 320 may be made of a combination of ferrous and non-ferrous materials, such that the array of electromagnets 310 may interact with the flywheel 320. The electromagnets 310 may exert a "pull" type force on a section of the ferrous material of the flywheel 320 as the section of the flywheel 320 approaches individual electromagnets of the array of electromagnets 310. Once the ferrous material reaches a certain point, the individual electromagnet may be de-energized until the individual electromagnet is needed to "pull" on a next section of ferrous material in sequence of the flywheel 320. The array of electromagnets 310 may be arranged around the outside of the flywheel 320 to alternately "pull" the ferrous material around in succession, keeping the flywheel 320 spinning at a predetermined speed.

In an alternative embodiment, actual magnets (e.g., permanent magnets) may be arranged on the flywheel 320. These magnets may be arranged equidistantly around the flywheel 320. The polarity of the individual electromagnets of the array of electromagnets 310 may be switched as an individual magnet of the magnets passes by/through the individual electromagnet, so that the individual electromagnet "pulls" the individual magnet as the individual magnet approaches the individual electromagnet and "pushes" as the individual magnet passes the individual electromagnet (e.g., similar to how a maglev train operates). This may be done simultaneously by each individual electromagnet of the array of electromagnets 310 to each individual magnet of the magnets.

In some embodiments of the power generator system 300, the flywheel 320 may be connected by shaft 330 to a series of pulleys and belts, sprockets and chains, and/or gears 340, which in turn may be connected by shaft 350 to the generator head 124.

In some embodiments, the array of electromagnets 310 may have a finned heat sink (not shown) attached thereto, or built into a casing of the array of electromagnets 310, so as provide air cooling and that may pull heat away from the electromagnet array 310. In some embodiments, the finned heat sink may additionally have the same configuration as the heat sink 142 described above and shown in FIG. 1.

Figure 4:
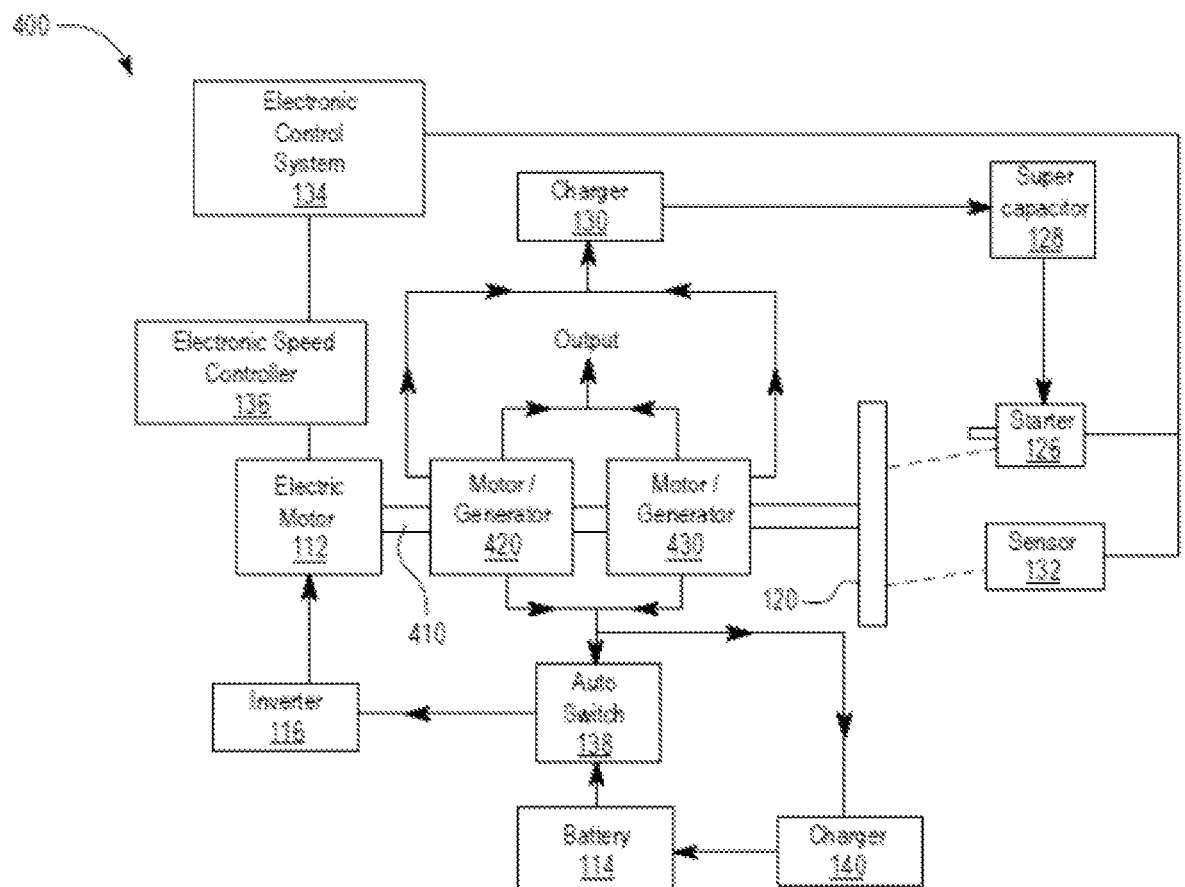
FIG. 4 shows a schematic diagram of a power generator according to one example embodiment.

FIG. 4 shows a power generator system 400 according to an example embodiment. The power generator system 400 may include a first combined motor/generator 420 and a second combined motor/generator 430. Each of the first and second motor/generator (420, 430) may be a 55 kW permanent magnet motor/generator (e.g., a motor/generator similar to the secondary motor/generator in the first generation of Chevrolet Volt™ vehicles).

In some embodiments, the electric motor 112 may be connected by a through-shaft 410 to the first combined motor/generator 420. The first combined motor/generator 420 may be connected by the through-shaft 410 to the second combined motor/generator 430. The second combined motor/generator 430 may be connected by the through-shaft 410 to the flywheel 120. Each of the first and second combined motors/generators 420, 430 may provide additional torque to the through-shaft 410 and may also act as a generator to produce output electricity.

In some embodiments, once the first and second combined motors/generators 420, 430 reach operational speed, the first and second combined motors/generators 420, 430 may provide power to the electric motor 112 via the auto switch 138 and the inverter 116. In addition, the first and second combined motors/generators 420, 430 may recharge the battery 114 using the charger 140, and may recharge the supercapacitor 128 using the charger 130. Further, the first and second combined motors/generators 420, 430 may provide power to external output devices.

As mentioned above, the power output of each of the first and second combined motors/generators 420, 430 may be 55 kW. In some embodiments, the first and second combined motors/generators 420, 430 may be relatively compact, decreasing the overall size of the power generator 400. Thus, the first and second combined motors/generators 420, 430 may be configured together so that they may generate a total of 110 kW in a relatively compact space.

A method of operating the power generator system 100 in one embodiment. Power from the dedicated power source (not shown) supplies electrical power to the electric motor 112 upon activation and/or start up of the power generator system 100. The sensor 132 of the electronic control system 135 relays rotational speed of at least one of the shaft 118 and the flywheel 120. In some embodiments, the electronic control system 134 may then activate the starter motor 126 to apply additional torque to the flywheel 120 until operational rotational speed of the flywheel 120 is achieved. The electronic control system 134 may deactivate the starter motor 126. The flywheel 120 may then rotate the generator head 124, which may generate usable output electricity. Once the generator head 124 is providing optimal output power, the generator head 124 may recharge the super capacitor 128 via the charger 130.

In another embodiment separate or concurrent with the embodiment immediately above, another method for starting and/or maintain the electric motor 112 upon activation of the power generator system 100. The electric motor 112 may receive additional power from the battery 114 when there may be an increase demand for output power. In this embodiment, the battery 114 may provide additional power directly to the electric motor 112 or through the inverter 116. The additional power may increase the rotational speed of the electric motor 112 that may increase that rotational speed and/or torque of the shaft 118. In some embodiments, the rotational speed and/or torque of the shaft 118 may be applied to the torque converter 122 to rotate the flywheel 120. The flywheel 120 may then rotate the generator head 124, which may generate usable output electricity. Once the generator head 124 is providing optimal output power, the generator head 124 may activate the auto switch 138 that may directly supply the additional power to the electric motor 112 or the inverter 116. Additionally, the generator head 124 may recharge the battery 114 via the charger 140.

In another embodiment, a third method for starting or maintaining the flywheel 320 of the power generator system 300. Upon activation of the power generator system 300, the battery 114 may apply the additional power to the array of electromagnets 310 when there may be an increase in demand for output power. The additional power may increase the rotational speed of the flywheel 320 (which may be made of ferrous and non-ferrous material or include a plurality of magnets) via the array of electromagnets 310 using "pull" and "push" forces. Once the generator head 124 is providing optimal output power, the generator head 124 may activate the auto switch 138 that may directly supply the additional power to the array of electromagnets 310. Additionally, the generator head 124 may recharge the battery 114 via the charger 140.

In another embodiment, a fourth method for starting or maintaining the electric motor 112 of the power generator system 400. The electric motor 112 may receive additional power from the battery 114 when there may be an increase demand for output power. In this embodiment, the battery 114 may provide additional power directly to the electric motor 112 or through the inverter 116. The additional power may increase the rotational speed of the electric motor 112 that may increase that rotational speed and/or torque of the shaft 410. In some embodiments, the rotational speed and/or torque of the shaft 410 may be applied at least one of the first and second combined motors/generators 420, 430 and to rotate the flywheel 120. In some embodiments, the flywheel 120 may assist in maintaining the rotational speed and/or torque applied to the first and second combined motors/generators 420, 430. The first and second combined motors/generators 420, 430 may generate usable output electricity. Once the first and second combined motors/generators 420, 430 is providing optimal output power, the at least one of the first and second combined motors/generators 420, 430 may activate the auto switch 138 that may directly supply the additional power to the electric motor 112 or the inverter 116. Additionally, the at least one of the first and second combined motors/generators 420, 430 may recharge the battery 114 via the charger 140.

While the disclosure has been described with reference to exemplary embodiments, it is to be understood that the disclosure is not limited to the disclosed exemplary embodiments. Additionally, it is to be understood that of the many embodiments describe, any and all embodiments may be in combination with one another. The scope of the following claims is to be accorded the broadest interpretation so as to encompass all such modifications and equivalent structures and functions.

The invention claimed is:

1. A self-contained, stand-alone power generator system comprising:
    an electric motor for applying torque to a shaft of a rotating mass, wherein the electric motor is powered by a dedicated power source;
    a battery for supplying additional power to the electric motor upon start up;
    at least one of a torque converter and a starter motor, for overcoming resting inertia of the rotating mass;
    a generator head coupled to the rotating mass,
    wherein the power generator is constructed such that when the generator head reaches operational speed, the generator head provides the additional power to the electric motor and recharges the battery.

2. The power generator system according to claim 1, further comprises a super capacitor for supplying energy to the starter motor, wherein the super capacitor is recharged by the generator head.

3. The power generator system according to claim 1, wherein the electric motor is connected to the shaft using at least one of a gear, a sprocket and chain, and a pulley and belt.

4. The power generator system according to claim 1, further comprising a sensor to monitor at least one of a rotational speed and a position of the rotating mass.

5. The power generator system according to claim 1, further comprising an electronic control system for controlling a speed of the electric motor via an electronic speed controller.

6. The power generator system according to claim 1, wherein the battery and the generator head are electrically connected to the electric motor via an inverter.

7. The power generator system according to claim 1, wherein the rotating mass is connected to the generator head via at least one of a gear, a sprocket and chain, and a pulley and belt.

8. The power generator system according to claim 1, further comprising an automatic switch configured to, when the generator head has reached a predetermined operational speed, switch from the additional power supplied by the battery to a generated power supplied by the generator head.

9. The power generator system according to claim 1, wherein a heat sink is attached to or incorporated into a casing of at least one of the generator head and electric motor, so as to pull heat away from the at least one of the generator head and electric motor.

10. A self-contained, stand-alone power generator system, comprising:
 an electric motor for applying torque to a shaft of a rotating mass, wherein the electric motor is powered by a dedicated power source;
 at least one electromagnet for generating a magnetic field that exerts a force upon the rotating mass;
 a battery for supplying additional power to the at least one electromagnet upon start up;
 a starter motor for overcoming resting inertia of the rotating mass; and
 a generator head coupled to the rotating mass,
 wherein the power generator is constructed such that when the generator head reaches operational speed, the generator head provides the additional power to the at least one electromagnet and recharges the battery.

11. The power generator system according to claim 10, further comprises a super capacitor for supplying energy to the starter motor, wherein the super capacitor is recharged by the generator head.

12. The power generator system according to claim 10, further comprising a sensor to monitor at least one of a rotational speed and a position of the rotating mass.

13. The power generator system according to claim 10, further comprising an electronic control system for controlling the at least one electromagnet.

14. The power generator system according to claim 10, wherein the battery and the generator head are electrically connected to the at least one electromagnet via an inverter.

15. The power generator system according to claim 10, wherein the rotating mass is connected to the generator head via at least one of a gear, a sprocket and chain, and a pulley and belt.

16. The power generator system according to claim 10, further comprising an automatic switch configured to, when the generator head has reached a predetermined operational speed, switch from the additional power supplied by the battery to a generated power supplied by the generator head.

17. The power generator system according to claim 10, wherein the at least one electromagnet is an array of electromagnets arranged around an outside of the rotating mass.

18. A self-contained, stand-alone power generator system comprising
 an electric motor for applying torque to a shaft of a rotating mass, wherein the electric motor is powered by a dedicated power source;
 a battery for supplying additional power to the electric motor upon start up;
 a first motor/generator connected by a shaft to the electric motor; and
 a second motor/generator connected by a shaft to the first motor/generator,
 wherein the second motor/generator is connected to the shaft of the rotating mass, and
 wherein the first and second motors/generators are constructed such that when the first and second motors/generators reach operational speed, the first and second motors/generators provide power to the electric motor and recharge the battery.

\* \* \* \* \*